(12) United States Patent
Adjabeng

(10) Patent No.: US 9,005,403 B2
(45) Date of Patent: Apr. 14, 2015

(54) ROTARY EVAPORATOR

(75) Inventor: George M. Adjabeng, Apex, NC (US)

(73) Assignee: Ecodyst, Inc., Raleigh, NC (US)

( * ) Notice: Subject to any disclaimer, the term of this patent is extended or adjusted under 35 U.S.C. 154(b) by 1217 days.

(21) Appl. No.: 12/888,259

(22) Filed: Sep. 22, 2010

(65) Prior Publication Data

US 2011/0073459 A1 Mar. 31, 2011

Related U.S. Application Data

(60) Provisional application No. 61/245,988, filed on Sep. 25, 2009.

(51) Int. Cl.
*B01D 3/02* (2006.01)
*B01D 1/00* (2006.01)
*B01D 1/22* (2006.01)
*B01D 3/08* (2006.01)
*B01D 3/10* (2006.01)
*B01D 5/00* (2006.01)

(52) U.S. Cl.
CPC ............... *B01D 1/0052* (2013.01); *B01D 1/228* (2013.01); *B01D 3/085* (2013.01); *B01D 3/10* (2013.01); *B01D 5/006* (2013.01); *Y10S 203/02* (2013.01)

(58) Field of Classification Search
CPC .................. C02F 1/04–1/18; B01D 3/085
USPC ................. 202/185.1–185.6, 100, 238, 266; 203/91–94, DIG. 2; 159/9.1–10, 159/11.1–12, 25.1–25.2
See application file for complete search history.

(56) References Cited

U.S. PATENT DOCUMENTS

| | | | |
|---|---|---|---|
| 4,471,633 A | | 9/1984 | Tinsler |
| 4,522,684 A | | 6/1985 | Saito |
| 5,176,799 A | | 1/1993 | Roe et al. |
| 5,243,836 A | | 9/1993 | Spring |
| 5,340,444 A | * | 8/1994 | van der Heijden ............ 202/186 |
| 5,639,354 A | * | 6/1997 | Zellweger ...................... 202/238 |
| 5,919,339 A | * | 7/1999 | Ikeda ............................. 202/238 |
| 6,709,025 B2 | | 3/2004 | Spring |
| 6,740,206 B2 | | 5/2004 | Genser |
| 6,925,820 B2 | | 8/2005 | Erisgen |
| 2010/0193140 A1 | | 8/2010 | Carl |

FOREIGN PATENT DOCUMENTS

DE 4231458 A1 * 3/1994

* cited by examiner

*Primary Examiner* — Thomas McKenzie
(74) *Attorney, Agent, or Firm* — David Bradin

(57) ABSTRACT

A rotary evaporator comprising a motor, a rotary joint movably inserted to a motor rotor of the motor by a sleeve in an axial direction, a collection flask attached to the rotary joint at one end of the joint, with a condenser attached to the other end of the joint. The condenser is adapted to receive a cooling coil from an immersion cooler. The cooling coil is attached to the base unit of the immersion cooler via an insulated hose. The rotary evaporator is adapted to provide various ways to remove heat from the flask in the water bath, whether by mechanically lowering the water bath, dropping fluid from the bath into an underlying reservoir, or raising and lowering the rotary evaporator out of the bath. Where the rotary evaporator is raised and lowered, the immersion cooler can remain in place if the hose connecting the base unit to the cooling coil is sufficiently long, or the condenser includes a flexible portion that accommodates the upward and downward movement.

8 Claims, 8 Drawing Sheets

--Prior Art---

Figure 1: Conventional Rotary Evaporator

ROTARY EVAPORATOR

FIELD OF THE INVENTION

The present invention relates to a rotary evaporator, and relates more particularly to a combination of a rotary evaporator and an immersion cooler that can improve the environmental impact of rotary evaporators in the laboratory.

BACKGROUND OF THE INVENTION

Rotary evaporators are in widespread use in virtually every laboratory in the world, for removing solvents from organic and inorganic solutions, to yield a liquid or solid product.

The evaporators work by placing a sample in a round-bottom flask, typically a pear-shaped flask, which spins on an axis at an angle while sitting in a water bath. The flask is attached to a motor, which includes a rotary joint that enables the flask to spin, while permitting the evaporated solvent to flow through the joint (vapor duct) and come into contact with one or more condensers. The condenser(s) cool the vapor, and the resulting cooled vapor (i.e., liquid) then flows down to a flask below the condenser, where it can be collected.

A water bath is typically provided to supply sufficient heat to the flask to evaporate the solvent. Typically, the rotor, the motor, the rotary joint, the condenser, the flask used to hold the original solvent, and the flask used to hold the condensed vapor as it is collected, are all connected while the unit is in operation. A mechanical arm is usually provided to raise and lower the connected parts, to bring the flask out of the water bath, although this can also be accomplished using a motorized means.

The condenser of the rotary evaporator can be connected to a water source, and water is frequently acceptable to condense the solvent of interest, particularly if the solvent has a relatively high boiling point. Users frequently leave the water flowing through the condenser throughout the day, which results in large volumes of waste water. Further, where the solvent has a particularly low boiling point, it can be advantageous to cool the vapor to temperatures cooler than a water condenser can provide. To only use a water-cooled condenser might create an environmental issue, as a significant volume of volatile organic solvent would not be collected, and enter into the environment.

Particularly when low boiling solvents are used, efforts have been made to improve on the condensation of the vapors so as to trap a significant portion of the solvents. In such cases, one approach is to use a dry-ice condenser, which is packed with dry ice, and, optionally, a solvent that forms a slurry with dry ice to maintain a given temperature (for example, dry ice-acetone maintains a temperature of $-78°$ C.). This can be a burden to the scientists, who have to replace the dry ice in their condensers throughout the day, particularly where a laboratory has a significant number of scientists accessing the same source of dry ice.

Other efforts to lower the temperature of the condenser beyond that provided by running water have included using chillers. Chillers are attached to the condenser using the entrance and exit ports on the water-cooled condensers through which water would otherwise flow, and the cooling liquid is continuously recycled through the chillers. One limitation of the chillers is that the fluids tend to be only marginally cooler than water (i.e., they are typically limited to fluids that are cooled to around $-15$ to $-20°$ C.). Another limitation is that they can be extremely expensive.

It would be advantageous to provide additional rotary evaporators that provide integrated cooling in a manner in which low boiling solvents are efficiently trapped. The present invention provides such rotary evaporators.

SUMMARY OF THE INVENTION

Rotary evaporators that include integrated cooling in the form of an attached immersion cooler are provided. The rotary evaporators include a water bath, a flask containing a solvent to be evaporated, and positioned in the bath, a rotary joint attached to the flask on one side of the joint, typically a ground glass joint, a motor that rotates the rotary joint, one or more condensers attached to the other side of the rotary joint, in series or in parallel, and one or more flasks attached to the condensers to receive the condensed vapors.

A vacuum pump or other means for providing a vacuum can be provided, and is typically attached to a vacuum hose at one end of the hose, and the other end of the hose is attached to the condenser at a point sufficiently high on the condenser that vapors will have condensed before reaching that point (thus ensuring that the vapors are trapped in the flask below the condenser).

The condensers, such as dry ice condensers, are capable of receiving, or are adapted to receive, the cooling coil portion of an immersion cooler. The immersion cooler provides efficient cooling capacity while eliminating the hassles associated with chemical refrigerants such as dry ice and dry ice/acetone mixtures. The immersion cooler includes a base unit that cools a recirculating gas or liquid, a cooling coil through which the cooled, recirculating gas or liquid flows, and an insulated hose that transports the recirculating gas or liquid to and from the base unit and a cooling coil. The cooling coil can be appropriately sized to fit the condenser, or can be equipped with a plug that fits around the insulated hose, and within the top portion of the condenser much like a cork fits inside the top of a bottle, or a one-hole stopper fits inside of a hole in a round-bottom flask.

In use, the cooling coil is placed inside of a condenser, such as a dry ice condenser, which condenser is adapted to receive an external means of cooling on a surface other than the surface on which the evaporated vapor comes into contact. In one embodiment, the condenser is partially filled with a fluid that is cooled by the cooling coil, and in another embodiment, the cooling is due to the physical contact of the cooling coil with the wall of the condenser.

Ideally, the immersion cooler and rotary evaporator are provided as component parts of a single unitary device rather than as separate components, and can both be controlled from a single control panel. Such a control panel typically includes a knob or switch that initiates the rotary movement of the motor, typically in such a fashion that the speed can be raised or lowered as desired. The panel typically also includes a knob or switch that turns on and adjusts the temperature of the immersion cooler, as well as the temperature of the water bath.

In those embodiments where the immersion cooler and rotary evaporator are provided as a single unitary device, and the rotary evaporator and immersion cooler are physically attached to one another, it can be difficult to raise and lower the combination of the rotary evaporate and immersion cooler out of a water bath in the same way that the rotary evaporator is typically raised and lowered out of a water bath. Accordingly, the present invention provides various embodiments for removing the flask from the water bath, or for removing heat from the water bath, without having to raise or lower the entire unit.

In one embodiment, the water bath is present on a lift, such that the bath has to be raised to engage (and heat) the flask, rather than having the flask lowered into the water bath. In this embodiment, the lift can be a manual, electric, or hydraulic lift. If the lift is electric or hydraulic, it can be controlled, for example, using a further knob on a central control panel.

In another embodiment, the level of fluid that heats the flask is adjusted by using a reservoir beneath the water bath, such that the heating fluid, such as hot water or hot oil, can be removed by lowering the level of heating fluid to a position below the flask.

In a third embodiment, a condenser is used which has the flexibility to be raised or lowered, for example, using accordion pleats or other expandable/contractible means, so that the rotary evaporator portion of the apparatus can be raised and lowered without moving the immersion cooler apparatus.

In a fourth embodiment, the immersion cooler apparatus has a significantly long hose attachment between the cooling coil inserted into the condenser and the base unit, such that the rotary evaporator portion of the apparatus can be raised and lowered without moving the immersion cooler apparatus, only the hose.

In the third and fourth embodiment, although the immersion cooler and rotary evaporator can be present in a single unitary device, the rotary evaporator portion of the device can be raised and lowered, rather than the bath or the fluid level in the bath, while the base unit of the immersion cooler remains in its original position.

These aspects of the invention will be better understood with reference to the following detailed description.

DETAILED DESCRIPTION

Figure 1:
FIG. 1 is a schematic illustration of a conventional rotary evaporator.

A rotary evaporator capable of cooling evaporated solvents without using dry ice trap, a continuous flow of water, or a recirculating chiller, is disclosed. The evaporator uses mechanically refrigerated cooling/freezing technology to provide a cool reservoir capable of condensing vapors arising from such activities as solvent evaporation. By avoiding the waste of a continuous flow of water, or the use of dry ice and compatible solvents such as acetone and isopropyl alcohol, the device is environmentally beneficial.

The rotary evaporator described herein replaces the dry ice cooling systems used in conventional rotary evaporators with a permanent cooling technology based on refrigerant/coil cooling technology.

The rotary evaporator includes the usual components of a rotary evaporator, but also includes an immersion cooler attached to the condenser, where the immersion cooler includes a base unit (condensing unit), a cooling coil, and an insulated hose connecting the cooling coil to the base unit. The condenser is adapted to receive the cooling coil, and the use of the cooling coil rather than dry ice, or the constant flow of cold water (or refrigerated fluids) through a water-cooled condenser can be avoided.

The present invention will be better understood with reference to the following detailed description of the individual components.

I. The Rotary Evaporator

In general, a rotary evaporator includes a sample container, such as a flask, which is rotated integrally with a rotary joint. The flask is soaked within a water bath, and is connected to one end of the rotary joint through a vapor duct that is insertedly supported by a rotor of a motor through a sleeve. On the other side of the rotary joint, there are one or more condensers mounted on the main body of the motor.

The main body of the motor is structured by a stator and a motor housing. As the motor is engaged, for example, by supplying a current to the motor, a rotation force is given to flask within the water bath, through the rotary joint.

To be more specific, the rotary joint is insertedly supported by the sleeve in an insertion area. The sleeve is fixed in engagement with the motor rotor. Furthermore, the sleeve is rotatably supported by the motor main body at both ends thereof by means of bearings.

The rotary joint has a step section formed part of which is thick at the end portion of the insertion area near the sample container and the rotary joint is supported by the sleeve with an engagement between the step section and the sleeve. The step section defines an area of movement of the rotary joint along the axial direction by cooperating with a stopper ring provided in the sleeve. A sealing member is provided at the other end of the insertion area of the rotary joint near the condenser to seal between the rotary joint and the condenser by rotatably contacting with the outer peripheral surface of the rotary joint. The seal surface of the sealing member is in rotational contact with the outer peripheral surface of the rotary joint.

Typically, where a sample container, such as a flask, is too small to be sufficiently soaked within the water bath, one can provide an attachment, such as a joint means, between the sample container and the rotary joint to provide a long "arm" for connecting the sample container and the rotary joint so that the sample container can be sufficiently soaked within the water bath.

The rotary evaporator described herein includes a motor having a motor main body and a rotary means, a rotary joint insertedly supported and movable in an axial direction to the rotary means with an area of the insertion formed in a straight shape, a sample container connected to one end of the rotary joint, a condenser located near the other end portion of the rotary joint and mounted on the motor main body, a coupling means disposed in a space between the rotary means and the rotary joint, and a fastening means for pressuring the coupling means to integrate the coupling means with the rotary joint and the rotary means.

More specifically, the rotary means is provided with a motor rotor and a sleeve integrally engaged with the motor rotor. The fastening means is typically a fastening cap engaged with the sleeve to pressure the coupling means toward the other end portion of the rotary joint by a fastening force generated by the engagement.

On the other hand, it is also desirable that the fastening means is a fastening cap engaged with the motor main body to pressure the coupling means toward the other end portion of the rotary joint by a fastening force generated by the engagement.

Still further, the coupling member includes a plurality of bushes slidably mounted on the outer peripheral surface of the rotary joint and elastically deformable O ring disposed between the bushes so that the O ring is pressured by the fastening force through the bushes thereby said O rings are tightly contacted to the outer peripheral surface of the rotary joint and to the inner surface of the sleeve by elastic deformation.

In the rotary evaporator having the above-described construction according to the invention, the rotation of the motor rotor is transmitted to the rotary joint to rotate the rotary joint. With this arrangement, the rotation is transmitted to the sample container which is partially soaked within the water bath, and steam generated within the sample container passes through the rotary joint (vapor duct) and is condensed by the condenser.

In this connection, when the outer peripheral surface of the rotary joint is abraded by the sealing member, the fastening cap is loosened and the rotary joint is slightly moved in the axial direction thereof so that the rotary joint can be used again.

When the sample container is small, the fastening cap is loosened and the rotary joint is moved to an appropriate position along the axial direction thereof, and the fastening cap is fastened again so that the sample container can be set to an optimum position without using an attachment such as a joint member.

In one embodiment, the rotary joint can be moved in the axial direction for adjusting its position, and the contact position between the sealing member and the rotary joint can be easily adjusted. Therefore, if desired, the sample container can be rotated in an upright position rather than at an angled position. The condenser part that is attached to the rotary joint and the rotating motor unit are designed such that the rotary motor can be rotated to a horizontal position and allows the vapor duct that connected to the sample container to be vertical. The sample container can be soaked in the water bath vertically in a manner similar to a flask under distillation settings. This option reduces or prevents bumping, a problem commonly encountered when the evaporating flask is slanted.

Vertical Rotary Evaporator Embodiments

There are various embodiments in which the rotary evaporator can be used in such a fashion that the collection flask, including the solvent to be evaporated, is in a vertical rather than an angled orientation. In one such embodiment, a flexible connector or a ball and socket connector links the condenser to the rotary joint (vapor duct) to allow the rotary joint to be rotated from the axial position to a vertical position. In this embodiment, the condenser remains its vertical position, and only the rotating unit/vapor duct moves from the axial position to the vertical position.

In a second embodiment, a vertical rotary evaporator is provided whereby the condenser attaches to the rotary joint through an angled piece of glassware, such as a 90 degree angled piece of glassware. In this embodiment, the rotating unit stays in a fixed vertical position.

II. Mechanically Refrigerated Immersion Cooler Trap

Figure 2:
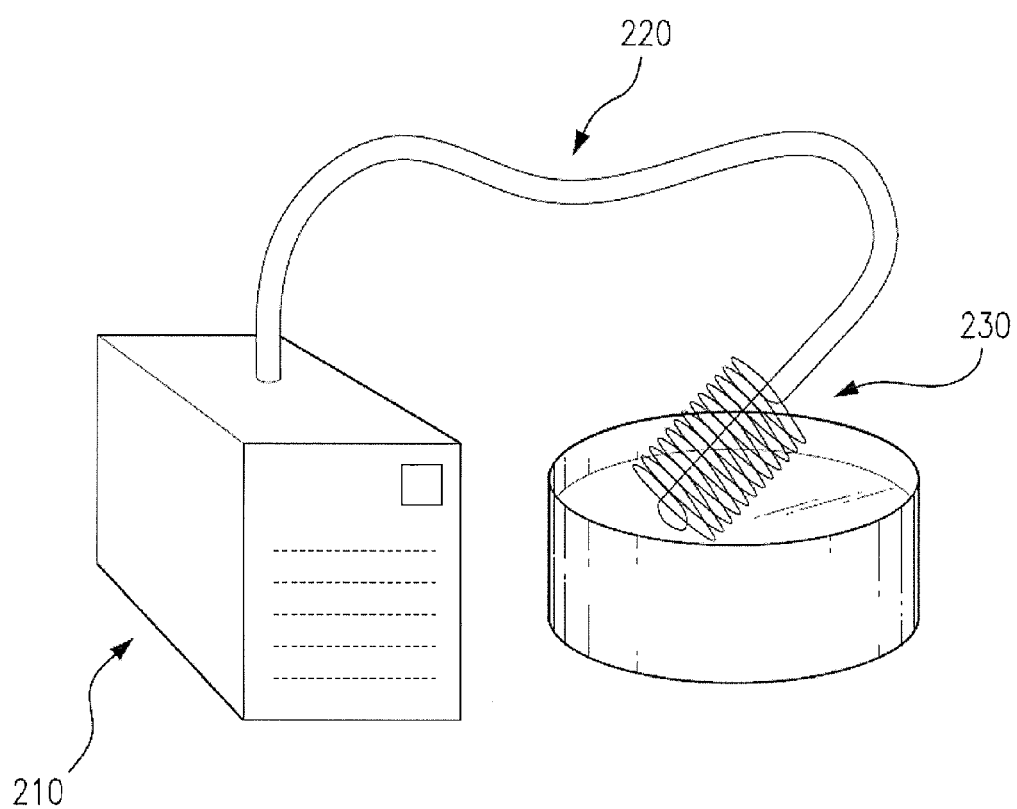
FIG. 2 is a schematic illustration of a conventional immersion cooler.

An immersion cooler, an example of which is shown in FIG. 2, typically includes a base unit that mechanically cools a fluid, a cooling coil, and a cooling coil.

In one embodiment, the cooling coil is appropriately sized to fit inside a conventional condenser, such as a dry-ice condenser. In this embodiment, the condenser has two walls, and the vapor to be condensed passes between the two walls. Cooling is supplied by the vapor coming into contact with the cooled inner wall, which wall is cooled by the cooling coil. In this embodiment, the coil can provide its cooling effect either through direct contact with the wall, or by contact with a fluid, such as water, brine, isopropyl alcohol, acetone, and the like, which cooled fluid then cools the wall.

In another embodiment, a cooling coil can be wrapped around a conventional condenser, so that the cooling is supplied by the vapor coming into contact with the cooled outer wall.

In a preferred embodiment, the cooling coil is either exposed, or concealed in a chemically-resistant vapor trap made of stainless steel, plastic, glass, rubber, such as neoprene rubber, or combinations thereof. The rotary evaporator vapor trap includes a cooling coil chamber that is cooled by direct expansion of refrigerant in refrigeration lines that are bonded directly to the inside of the chamber walls. That is, the condenser in this embodiment does not include two walls, like a conventional dry ice condenser, but rather, a single wall to which the cooling coil, or the vapor trap containing the cooling coil, is permanently connected. Such a condenser all includes a joint or other connection means to connect the condenser to a collection flask, which collection flask collects the cooled vapors, and also includes an appropriate means for connecting the condenser to a vacuum line, for example, a port, a tube, or hose, in case it is desired to evaporate the solvent of interest under vacuum. The vacuum is typically applied near the top of the condenser, to provide the maximum opportunity for the vapor to be cooled, thus minimizing the opportunity that solvent vapors will pass on to the vacuum system, such as to the vacuum pump or vacuum trap.

In a further embodiment, the cooling coil is either exposed, or concealed in a chemically-resistant vapor trap made of stainless steel, plastic, glass, rubber, such as neoprene rubber, or combinations thereof. The rotary evaporator vapor trap includes a chamber that is cooled by direct expansion of refrigerant in refrigeration lines in a cooling coil that is removably attached to the condenser, such as via an appropriately-sized hole at top of the condenser. The cooling is provided by the vapor coming into contact with the cooling coil within the chamber walls. That is, the condenser in this embodiment does not include two walls, like a conventional dry ice condenser, but rather, a single wall to which the cooling coil is removably connected. In one aspect of this embodiment, the cooling coil includes an insulated hose, connected to the base unit and to the cooling coil, and a sealing means, such as a neoprene stopper, encompasses the outside of a portion of the hose, and the inside of the opening on the condenser into which the cooling coil is inserted. Thus, the cooling coil lies within the condenser itself, and the seal allows for a vacuum to be provided to the condenser, while also allowing for the cooling coil to be removed as desired.

Figure 8:
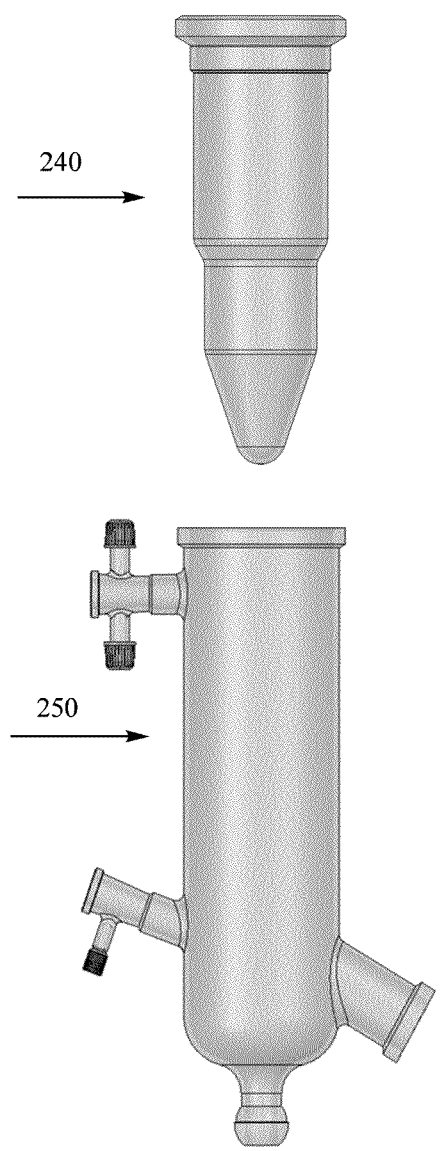
FIG. 8 is a schematic illustration of a condenser and a concealed cooling coil shaped to fit inside the condenser.

In the above-listed embodiments where the vapor contacts the cooling coil directly, both the inside and outside of cooling coil condenser (i.e., the outer wall of the condenser that is in contact with the cooling coil and the surfaces of the cooling coil not in contact with the wall of the condenser, but which contact the vapor), serve as vapor condensing surfaces. This provides a significantly larger vapor condensing surface compared to a conventional dry ice trap or water coolant trap. Where the cooling coil is concealed in a chemically-resistant vapor trap made of stainless steel, plastic, glass, rubber, such as neoprene rubber, or combinations thereof, if the concealed cooling coil does not include an opening at the bottom, the vapor only contacts the concealed cooling coil at the outer surface (for example, as shown in FIG. 8, the surface that is in contact with the condenser body). However, if the concealed cooling coil includes an opening at the bottom (for example, a concealed cooling coil like that shown in FIG. 8, but whereas at the bottom of the "bullet-shaped" concealed coil, there is an opening), then the outer and inner surfaces of the concealed coil are exposed to the vapor, and can cool the vapor.

Thus, in the first two embodiments, the condenser is an enclosed sealed unit and only the outside of the chamber serves as a vapor condensing surface (i.e., the cooling coil does not come into contact with the vapor, only with the wall of the condenser in which it is in contact). In the latter two embodiments, the cooling coil is either bonded, or removably attached, to the condenser wall, thus providing cooling on the entire exposed surface of the cooling coil.

In yet a further embodiment, the cooling coil is located between the walls of a condenser shaped like an otherwise conventional dry ice condenser, such that the cooling coil connects to both the inside and outside of the chamber walls, thus create a hollow chamber. In this embodiment, vapor is condensed on both the inside and outside surfaces of the chamber.

In each of these embodiments, a condensing unit (compressor) provides desired cooling in a temperature range from about −20° C. to about −150° C. The mechanically refrigerated cooling coil can be connected to a highly efficient and energy saving condensing unit through an insulated hose. The mechanically refrigerated cooling coil trap is either part of the condenser, or is inserted into the condenser, to condense vapors during rotary evaporation.

III. Motor for Raising and Lowering the Water Bath

In one embodiment, the rotary evaporator includes a motor underneath the water bath to raise and lower the bath relative to the collection flask. In this embodiment, the rotary evaporator itself, and the immersion cooler attached to the rotary evaporator, remains in a fixed position, whereas the bath moves up and down. Since the bath weighs significantly less than the remainder of the device, this embodiment greatly reduces the wear on any motor that would otherwise be used to raise and lower the rotary evaporator.

Figure 5:
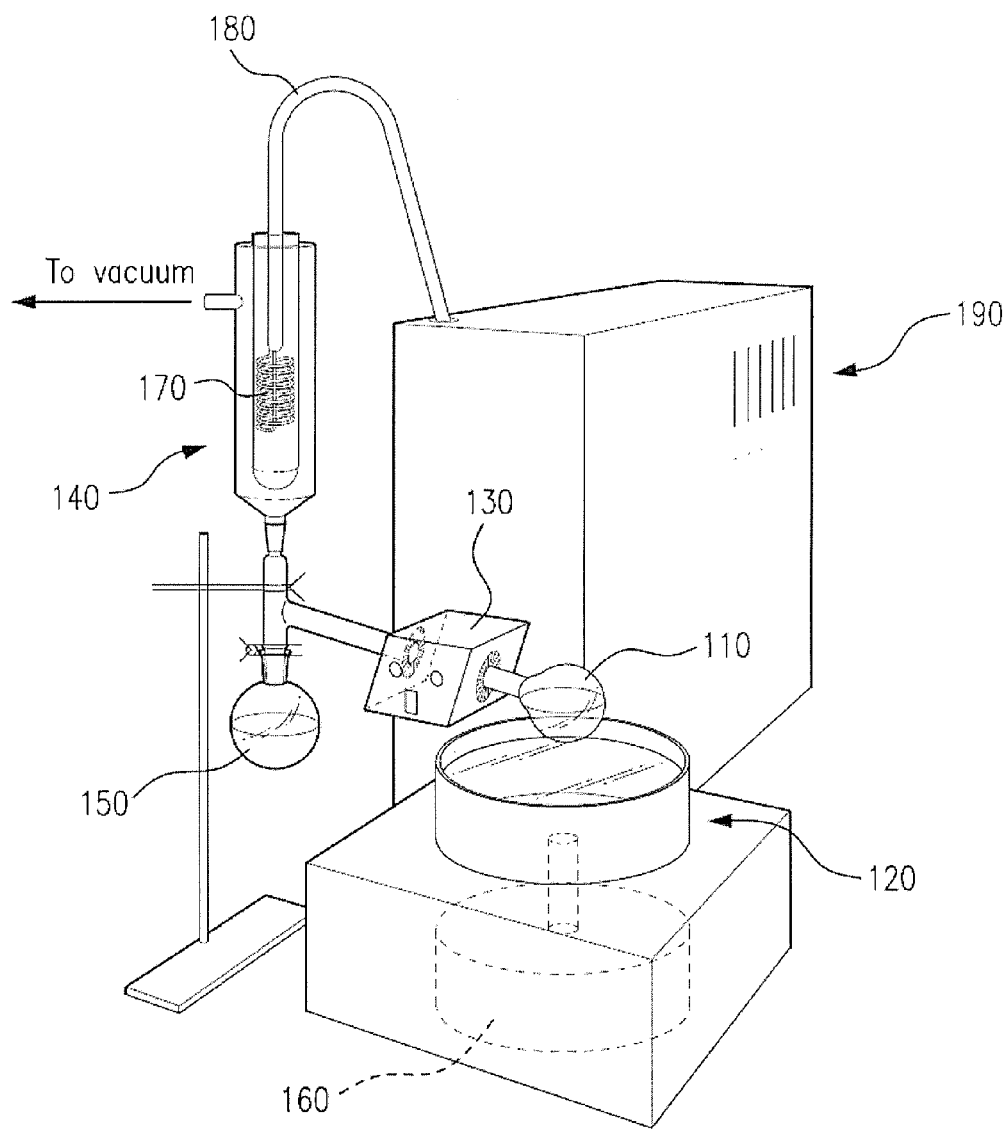
FIG. 5 is a schematic illustration of an improved rotary evaporator including an immersion cooler attached to a rotary evaporator, and including a reservoir underneath the heating bath for raising and lowering levels of the heating fluid that heats the collection flask, so as to avoid using a motor to raise and lower the bath.

This embodiment is shown in more detail in FIG. 5.

IV. Use of Reservoir Means to Raise and Lower Fluid Levels in the Water Bath

In another embodiment, the collection flask is lowered into a water bath equipped with a reservoir, where the reservoir permits the user to raise and lower the liquid levels in which the collection flask to be heated or cooled can be immersed.

The water bath is arranged on top of the supply reservoir. The liquid can be delivered, for example, with an immersion pump through a feed pipe and an opening in the bottom of the bath. The level of the liquid in the bath can be adjusted with the aid of a slider. In one aspect of this embodiment, the liquid can flow back into the supply reservoir over an overflow. In another aspect of this embodiment, when the pump is switched off, the liquid in the bath flows independently back into the supply reservoir.

The collection flask can thus be heated and cooled without having to raise or lower the water bath itself, or the remainder of the rotary evaporator. In this embodiment, the cooling can be achieved more rapidly than those embodiments using so called "rapid lift supports" to move the entire rotary evaporator, or water bath. Further, the ability to drain the hot liquid-filled bath reduces the danger associated with potential burn injuries, especially in the case of oil baths, as the oil is drained away from the user. Lifting and lowering of the bath is no longer necessary, and as a result considerably simpler supports can be employed. The volume of the liquid can at the same time perhaps be reduced since the shape of the basin can be optimally adjusted to the shape of the reaction flask.

An especially high level of operational safety and optimum heat control can be aimed for if the supply reservoir is placed beneath the bath, and if the bath at least partly closes-off the supply reservoir. The supply reservoir containing the hot or the cold liquid is thus completely covered, and only exceptionally small liquid losses will occur through evaporation when not in use. In addition, the bath can be empty when not in use, reducing the risk of an object falling into the liquid during handling. In one aspect of this embodiment, the liquid outlet in the bath is formed as an adjustable overflow, for example as a height adjustable slider in the wall of the bath, with which the liquid level can be set. In this aspect, the liquid level can be quickly adjusted to the size of the reaction flask to be immersed. The liquid displacement of the reaction flask must no longer be taken into account, so when immersing a larger flask, the excess liquid simply runs off through the overflow.

In another aspect of this embodiment, the bath is formed in two parts and if the bath body, fixed in relation to the supply reservoir, possesses a displaceable vertical side-wall. With the aid of the displaceable bath side-wall, the capacity of the bath can be changed, and can also form the overflow for limiting the liquid level in the bath.

The displaceable bath side-wall is ideally guided on the bath body, which can most easily be achieved if the shape of the bath is rotationally symmetrical, and the displaceable bath side-wall is of cylindrical shape, or in the form of a bellows, supported and guided in a suitable manner.

The height of the displaceable bath side-wall can be adjusted manually, or, alternatively, using an upright float located in the bath body which has sufficient buoyancy to displace the bath side-wall from its lower rest position to its upper operating position when the liquid is introduced into the bath. The upper operating position can also be adjustable using a mechanical stop. Thus, the bath side-wall can automatically be positioned upwards, and will remain in this position until the liquid is once again drained from the bath, at which point the bath side-wall will return to the lower rest position. This has the advantage that the bath requires little space when not in operation, so that handling over the bath will be free and unobstructed. The maximum bath height will only be reached when the device is put into operation. The float is preferably formed as a hollow chamber, with an open underside. This type of float is easy to manufacture and possesses sufficient buoyancy from the air trapped inside it.

For an optimum return flow of the liquid, the displaceable side-wall can be formed as a hollow wall, whereby the inner rim forms the overflow and the outer rim of the hollow wall is somewhat higher than the inner rim. The outer rim can thus function as a protection for the overflow.

If the feed pipe is leads to an opening in the bottom of the bath, and if the feed pipe has a gradient from the opening down to the supply reservoir, the bath can be emptied without pumping. However, an immersion pump can be situated in the supply reservoir and connected to the feed pipe, such that, as soon as the immersion pump is switched off, the liquid drains out of the bath through the immersion pump back into the supply reservoir. The return flow rate is thereby a question of the dimensions of the feed pipe and the pump. Alternatively, one can suck the liquid out of the bath by reversing a suitable pump.

V. Use of Elongated Insulated Hoses and/or Flexible Condensers

In one embodiment, rather than raising and lowering the water bath, or using a reservoir beneath the bath to add and remove fluid, one can raise and lower the rotary evaporator portion of the apparatus without having to move the immersion cooler attached to the base of the rotary evaporator.

There are various aspects of this embodiment. In one aspect, the flexible, insulated hose that connects the cooling coil to the base of the immersion cooler (condensing unit or compressor) is elongated, so as to accommodate the upward and downward movement of the condenser to which the cooling coil is engaged, which condenser moves upward and downward as the rest of the rotary evaporator portion of the apparatus is raised and lowered. In another aspect of this embodiment, the condenser itself includes a flexible portion that allows the condenser to expand and contract as the rest of the rotary evaporator portion of the apparatus is raised and lowered, which minimizes or eliminates movement of the cooling coil trap. The flexible portion of the condenser ideally has a "bellows" type shape, with accordion pleats, which allow for expansion and contraction. Silicon, such as that used in baking pans and the like, can be an ideal material with which to form the flexible portion of the condenser, as it is capable of handling variations in temperature, and is inert to most solvents. The flexible portion can equally be made from any chemically resistant material such as plastic, rubber, a combination of plastic and wire, or rubber and wire that is strong enough to withstand vacuum pressure during rotary evaporation and flexible enough to contract and expand when moved up and down. This flexible portion can be at or near the top, the bottom, or the middle of the condenser, and extends for a sufficient distance to allow for up and down movement of the rotary evaporator without moving the cooling coil affixed, permanently or removably, within the condenser.

In another embodiment, the connecting glass piece between the condenser and the rotary joint/vapor duct is made of ball and socket joints that allow the evaporating flask to be moved up and down, but not the condensing unit. The ball and socket joint(s) are designed in a manner such as to afford a tight vacuum seal during operation.

Embodiments of the present invention will be explained in detail below with reference to FIG. 1 to FIG. 5.

FIG. 1 denotes a conventional rotary evaporator, which is structured by a supporting pillar on a base, a motor which becomes a rotary driving unit supported by the supporting pillar through a lifting unit capable of moving upwards and downwards, a sample container, such as a flask, to which a rotation is applied by the motor, a condenser mounted on the upper side of a motor main body of the motor, a receiving flask connected to the condenser, and a water bath for heating the sample container.

The condenser located near the end portion of the rotary joint is made of glass and its mouth section is integrally supported by being coupled with the motor main body through a ring-shaped member elastically deformable by a fastening force of a fastening cap which is engaged with a screw section provided outside the motor housing. When the fastening cap is fastened, a sealing is secured in the connection area of the condenser by applying a pressure to a sealing member elastically connected with the outer peripheral surface of the rotary joint inside the screw section through the ring-shaped member provided inside the fastening cap. As shown in FIG. 1, on the condenser, the receiving flask, a sample poring opening, a vacuum absorbing opening and a cooling water connection opening are provided. A vacuum pump (not shown) is connected to the vacuum absorbing opening and a water supply tube (not shown) is connected to the cooling water connection opening.

A plurality of bushes and a plurality of O rings are provided respectively in the area between the outer peripheral surface of the rotary joint and the inner surface of the sleeve. The plurality of O rings are disposed between the bushes.

The O rings are pressured in the axial direction by a fastening force applied when the fastening cap engaged with the screw section provided in the sleeve is fastened. When the bush in the far end is brought into contact with a step section of the sleeve, the O rings are elastically deformed by being sandwiched between the bushes. This makes the O rings to be in strong elastic contact with the outer peripheral surface of the rotary joint and the inner surface of the sleeve so that a strong frictional force is generated, thereby the plurality of bushes and the O rings are integrally coupled with the sleeve and the rotary joint. In other words, the O rings are tightly pressuredly contacted to the outer peripheral surface of the rotary joint and to the inner surface of the sleeve by elastically deformed.

FIG. 2 is an illustration of a conventional immersion cooler, which includes a base unit (210), an insulated hose (220) through which cooled gases or fluids can be passed to a cooling coil, and a cooling coil (230). The dimensions of the cooling coil can be modified as appropriate to fit a variety of differently sized condensers on the rotary evaporator.

Figure 3:
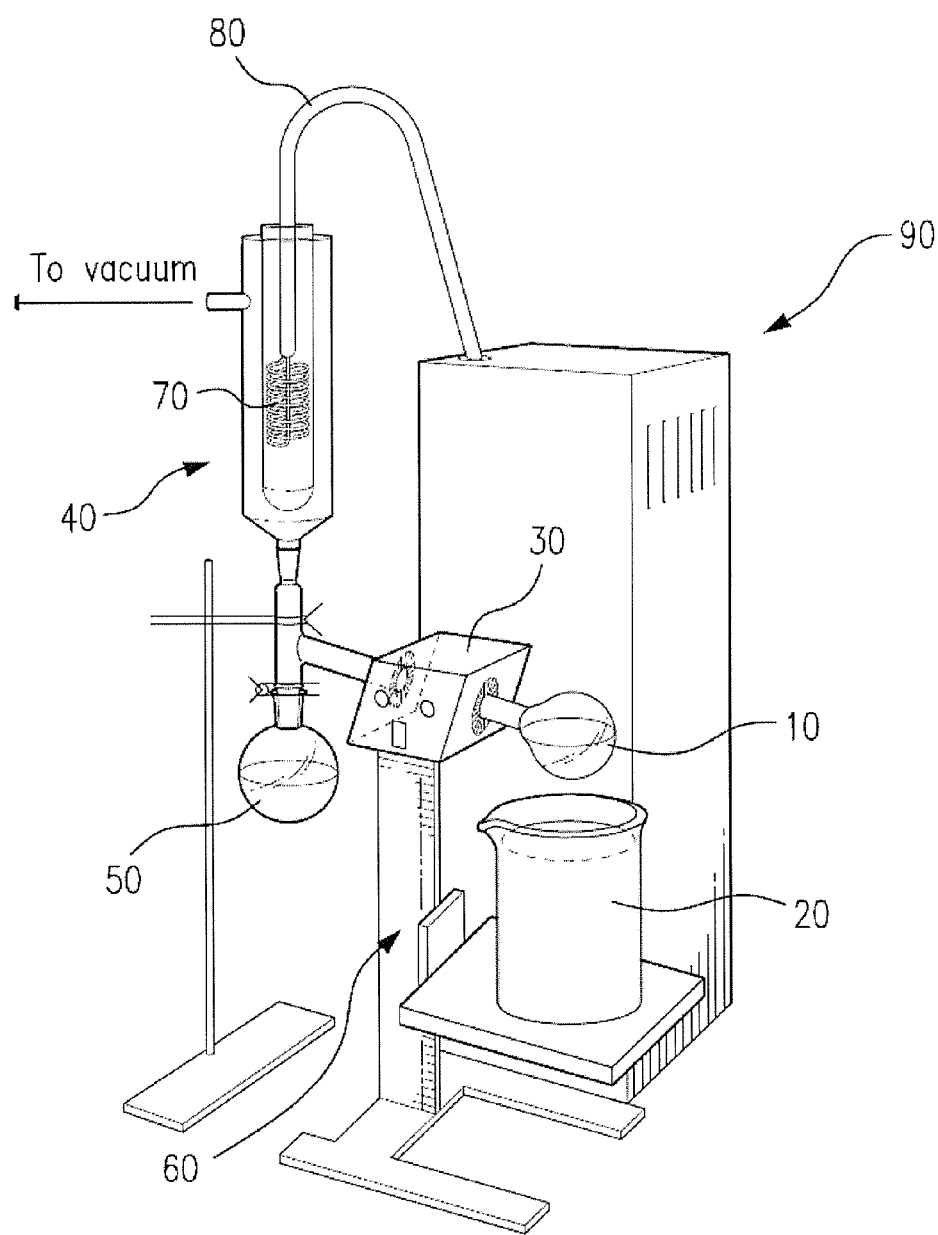
FIG. 3 is a schematic illustration of an improved rotary evaporator including an immersion cooler attached to a rotary evaporator, and including a motor for moving the heating bath up and down to communicate with the flask.

FIG. 3 is an illustration of a rotary evaporator as described herein, wherein the water bath is raised and lowered using a motor. As shown in FIG. 3, a collection (evaporating) flask (10) is immersed in a water bath (20). The flask is rotated using a motor (30), which motor is also connected, through a rotary joint (vapor duct), to a condenser (40). Vapors condense on the condenser and drop into a second flask (50). After the solvent has been removed (by evaporation), the flask (10) is removed from the water bath (20) by lowering the bath along channel 60 using a motor (not shown). Vapor is condensed in the condenser using a cooling coil (70), which is connected, via an insulated hose (80) to a cooling unit (90).

Figure 4:
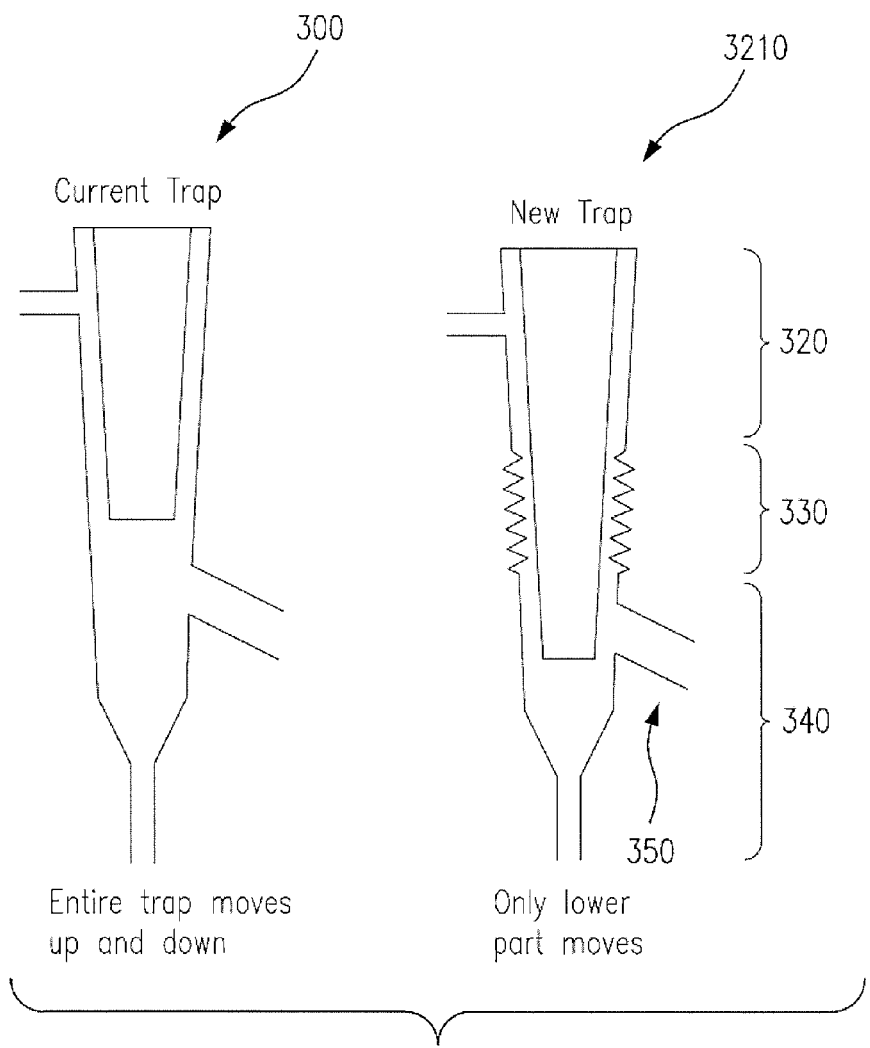
FIG. 4 is a schematic illustration of a condenser with a flexible portion, adapted to move up and down in response to motion of a rotary evaporator unit to which it is attached.

FIG. 4 is a schematic illustration of an expandable and contractible condenser (310), shown beside a conventional condenser (300). The expandable condenser has a trap with an upper part (320), a flexible middle part (330), and a lower part (340). The lower part of the condenser moves up and down, as it is connected to the rotary joint (350), which in turn is attached to a flask and heating bath (not shown), which flask can travel up and down as desired, to increase or decrease the temperature of the liquid in the flask.

FIG. 5 is a schematic illustration of a rotary evaporator as described herein, wherein the level of heating fluid in the water bath is raised and lowered using a reservoir beneath the water bath. As shown in FIG. 5, a collection flask (110) is immersed in a water bath (120). The flask is rotated using a motor (130), which motor is also connected, through a rotary joint, to a condenser (140). Vapors condense on the condenser and drop into a second flask (150). After the solvent has been removed (by evaporation), the flask (110) is removed from the water bath (120) by lowering the level of heating fluid, such as hot water or oil, in the bath by draining a portion of the fluid in reservoir 160 using a motor (not shown). Vapor is condensed in the condenser using a cooling coil (170), which is connected, via an insulated hose (180) to a cooling unit (190).

Figure 6:
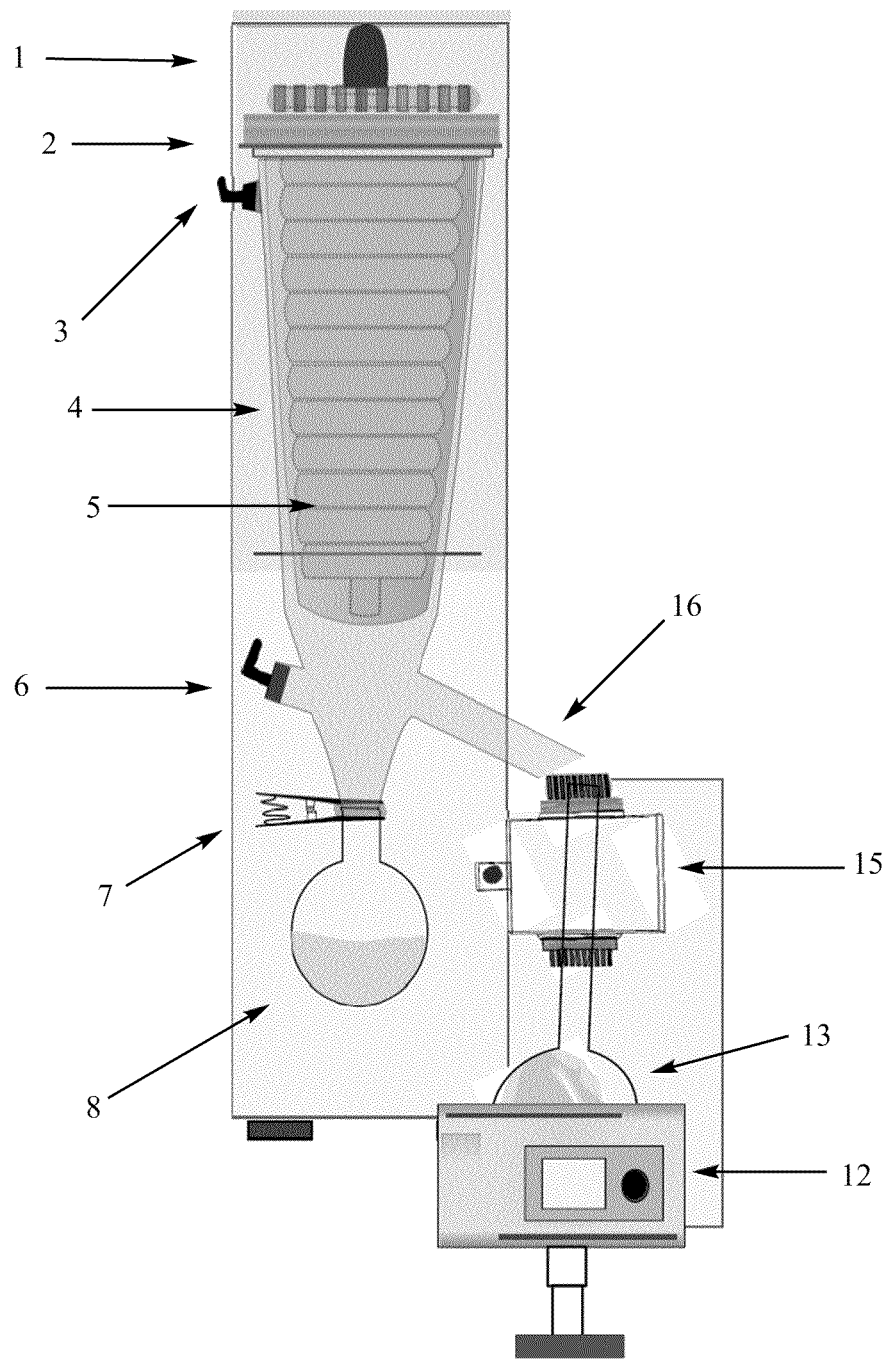
FIG. 6 is a schematic illustration of an improved rotary evaporator wherein the evaporating flask can be rotated in a vertical position, rather than an angled position.

FIG. 6 is a schematic illustration of a rotary evaporator in which the evaporation flask is in the vertical, rather than in the horizontal position. As shown in the figure, a vertical flask

(13) is connected to a rotary joint (15) at one end of the joint, which joint is connected at the other end of the joint to a condenser. The condenser is releasably attached to a collection flask (8) on a clip (7) to receive the condensed vapor. The condenser in this embodiment includes a single wall, and a cooling coil (5), appropriately sized to fill the condenser, is disposed within the condenser. The cooling coil is attached, via an insulated hose (1), to a mechanical cooling unit (not shown). The coiling coil is inserted into the condenser via an opening in the condenser appropriately sized to receive the cooling coil, and is affixed with a removable seal (2) to allow the coil to be removed. The flask is warmed via a water bath (12), which bath can be raised or lowered using a motor (11). As desired, vacuum can be pulled on the system through a port (3), and released through another port (6).

Figure 7:
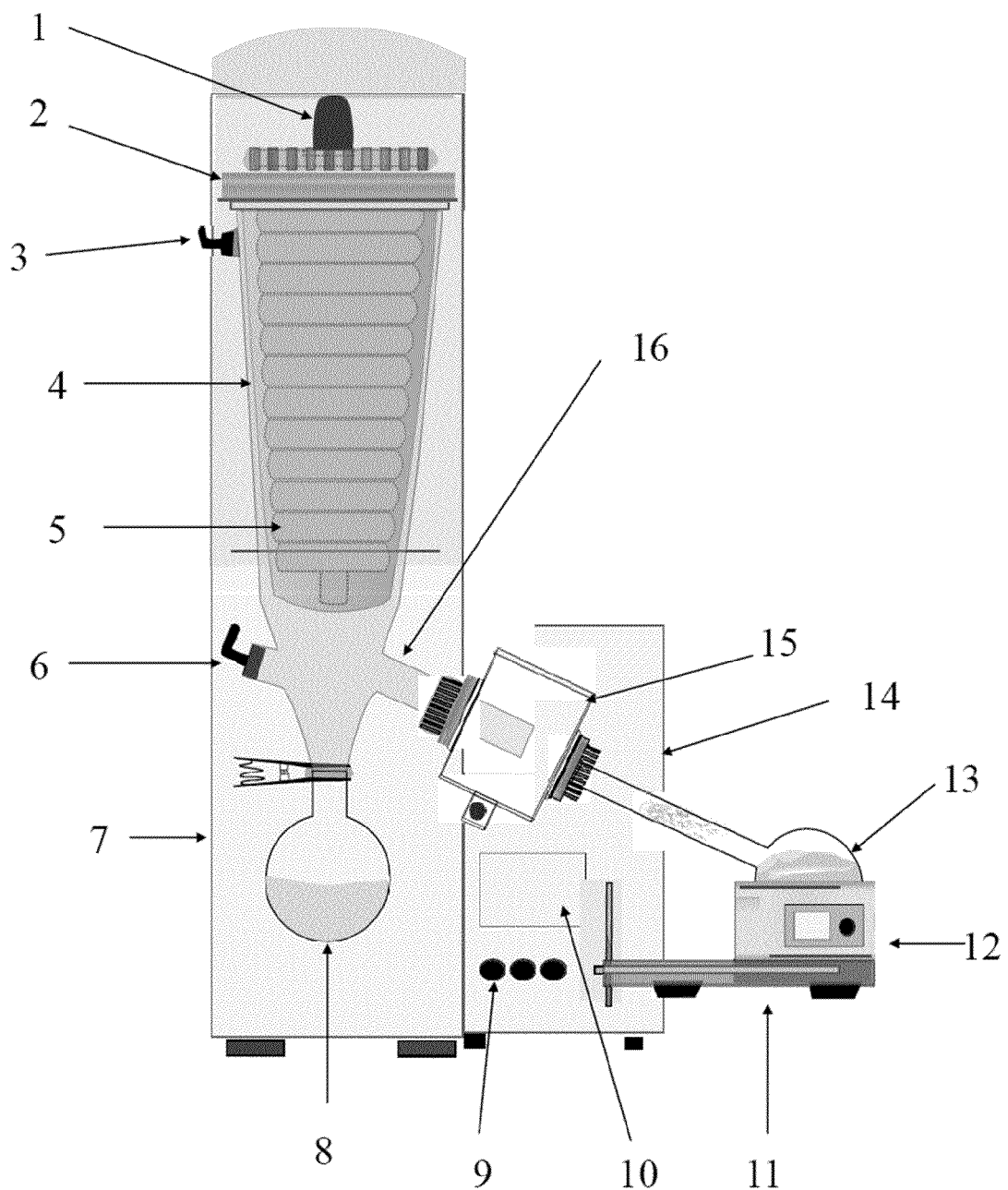
FIG. 7 is a schematic illustration of an improved rotary evaporate wherein the condenser includes a single wall, rather than an inner and an outer wall, and a cooling coil comes into direct contact with the evaporated solvent.

FIG. 7 is another schematic illustration of a rotary evaporator as described herein. As shown in FIG. 7, a flask (13) is connected to a rotary motor and rotary joint (15) at one end, and is connected at the other end to a condenser (16). The condenser is releasably attached via a clip (7) to a collection flask (8) to receive the condensed vapor. The condenser (16) in this embodiment includes a single wall (4), and a cooling coil (5), appropriately sized to fill the condenser, is disposed within the condenser. The cooling coil is attached, via an insulated hose (1), to a mechanical cooling unit (not shown). The coiling coil is inserted into the condenser via an opening in the condenser appropriately sized to receive the cooling coil, and is affixed with a removable seal (2) to allow the coil to be removed. The flask is warmed via a water bath (12), which bath can be raised or lowered using a motor (11). As desired, vacuum can be pulled on the system through a port (3), and released through another port (6).

The temperature of the water bath and/or the cooling coil can be visually displayed on a screen (10) on a base unit (14), and the temperatures can be controlled via appropriate knobs (9) that adjust the power to cooling and/or warming units.

FIG. 8 is a schematic illustration of a condenser and a concealed cooling coil, wherein the coil (240) is ideally concealed inside a thermally-conductive, inert material, such that when it is inserted into the condenser (250), it provides cooling to the condenser. In another aspect of this embodiment, the concealed cooling coil has an opening at the bottom, such that the vapors not only contact the outer surface of the concealed cooling coil, but the inner surface as well. In considering this embodiment, it is useful to think of the concealed cooling coil as a coil trapped in its coiled configuration by placing the coil within a solid wall, which wall has an inner and an outer surface. When inserted into the condenser, the outer surface is in close proximity to the wall of the condenser. The vapor contacts the outer surface of the concealed coil. However, by placing an opening in the concealed cooling coil, the vapor can contact the inside surface as well, exposing the vapor to more surface area, resulting in more efficient cooling.

All documents referred to herein are hereby incorporated by reference for all purposes.

While the foregoing specification teaches the principles of the present invention, with examples provided for the purpose of illustration, it will be understood that the practice of the invention encompasses all of the usual variations, adaptations and/or modifications as come within the scope of the following claims and their equivalents.

What is claimed is:

1. A rotary evaporator, comprising:
a) a motor having a motor main body and a rotary element;
b) a rotary joint insertedly supported and movable in an axial direction relative to said rotary element, with an area of the insertion formed in a straight shape;
c) a sample container connected to one end of said rotary joint;
d) a water bath in which the sample container can be placed, which water bath can provide heat energy to the sample container,
e) a condenser located adjacent the other end portion of said rotary joint and mounted on said motor main body;
wherein the condenser comprises an inside chamber,
wherein the condenser is adapted to receive a collection flask that receives condensed vapors condensed off of the condenser, and the condenser is also adapted to receive a cooling coil of a mechanical cooling unit;
f) a mechanical cooling unit with a cooling coil adapted to engage, and directly engaging, the condenser so as to provide the condenser with the ability to cool and condense vapors coming into contact with the condenser, wherein the cooling coil is permanently bonded directly to the inside chamber of the condenser, such that the mechanical cooling unit and the rotary evaporator are provided as a single unitary device, and
g) a motor adapted to raise and lower the water bath relative to the sample container or a reservoir below the water bath, which reservoir is adapted to have the ability to add heated fluid to the water bath to warm the sample container, and remove the heated fluid to cool the sample container.

2. The rotary evaporator of claim 1, wherein a) the condenser comprises a single wall with an inner and an outer surface, and vapor comes into contact with the condenser on the inner surface,
b) the cooling coil is engaged to the condenser by being permanently bonded to the inner surface of the single wall of the condenser, and
c) the condenser is sealed other than an entrance through which vapor can enter the condenser, condensed vapor can be passed from the condenser to a collection flask beneath the condenser, and an exit through which a vacuum can be pulled.

3. The rotary evaporator of claim 1, wherein the mechanical cooling unit is an immersion cooler.

4. The rotary evaporator of claim 1, wherein the cooling coil is exposed.

5. The rotary evaporator of claim 1, wherein the cooling coil is concealed in a chemically-resistant vapor trap.

6. The rotary evaporator of claim 5, wherein the chemically-resistant vapor trap is made of stainless steel, plastic, rubber, or combinations thereof.

7. A rotary evaporator, comprising:
a) a motor having a motor main body and a rotary element;
b) a rotary joint insertedly supported and movable in an axial direction relative to said rotary element, with an area of the insertion formed in a straight shape;
c) a sample container connected to one end of said rotary joint;
d) a water bath in which the sample container can be placed, which water bath can provide heat energy to the sample container,
e) a condenser located adjacent the other end portion of said rotary joint and mounted on said motor main body;
wherein the condenser is adapted to receive a collection flask that receives condensed vapors condensed off of the condenser, and the condenser is also adapted to receive a cooling coil of an immersion cooler;

f) an immersion cooler with a cooling coil adapted to engage the condenser so as to provide the condenser with the ability to cool and condense vapors coming into contact with the condenser, and g) a motor adapted to raise and lower the water bath relative to the sample container, or a reservoir below the water bath, which reservoir is adapted to have the ability to add heated fluid to the water bath to warm the sample container, and remove the heated fluid to cool the sample container, wherein the condenser comprises an inner and an outer wall, and evaporated vapor comes into contact between the inner and outer wall, and wherein the inner wall comprises an outer surface facing the outer wall, and an inner surface opposite the inner surface, and the cooling coil is engaged to the condenser by being permanently bonded to the inner surface of the inner wall of the condenser.

8. A rotary evaporator, comprising:

a) a motor having a motor main body and a rotary element;

b) a rotary joint insertedly supported and movable in an axial direction relative to said rotary element, with an area of the insertion formed in a straight shape;

c) a sample container connected to one end of said rotary joint;

d) a water bath in which the sample container can be placed, which water bath can provide heat energy to the sample container, e) a condenser located adjacent the other end portion of said rotary joint and mounted on said motor main body; wherein the condenser is adapted to receive a collection flask that receives condensed vapors condensed off of the condenser, and the condenser is also adapted to receive a cooling coil of an immersion cooler;

f) an immersion cooler with a cooling coil adapted to engage the condenser so as to provide the condenser with the ability to cool and condense vapors coming into contact with the condenser, and g) a motor adapted to raise and lower the water bath relative to the sample container, or a reservoir below the water bath, which reservoir is adapted to have the ability to add heated fluid to the water bath to warm the sample container, and remove the heated fluid to cool the sample container, wherein:

the condenser comprises an inner and an outer wall, where evaporated vapor comes into contact between the inner and outer wall, wherein the inner wall comprises an outer surface facing the outer wall, and an inner surface opposite the outer surface, and an opening adapted to receive a cooling coil wherein the opening is formed interior to the inner surface, and the cooling coil is engaged to the inner surface of the inner wall by being physically inserted into the opening.

* * * * *